United States Patent
Scheffer

(10) Patent No.: US 8,203,630 B2
(45) Date of Patent: Jun. 19, 2012

(54) METHOD FOR CORRECTING IMAGE SENSOR CONTROL CIRCUITRY HAVING FAULTY OUTPUT VALUES AND STRUCTURE THEREFOR

(75) Inventor: Danny Scheffer, Hulst (NL)

(73) Assignee: ON Semiconductor Trading, Ltd, Hamilton (BM)

( * ) Notice: Subject to any disclaimer, the term of this patent is extended or adjusted under 35 U.S.C. 154(b) by 435 days.

(21) Appl. No.: 12/257,312

(22) Filed: Oct. 23, 2008

(65) Prior Publication Data
US 2010/0092027 A1    Apr. 15, 2010

Related U.S. Application Data

(63) Continuation of application No. 12/251,414, filed on Oct. 14, 2008, now Pat. No. 7,974,805.

(51) Int. Cl.
*H04N 9/64* (2006.01)
*H04N 5/335* (2006.01)
*H04N 17/00* (2006.01)
*H01L 27/00* (2006.01)
*H01L 27/146* (2006.01)
*H05G 1/64* (2006.01)

(52) U.S. Cl. ........ 348/246; 348/308; 348/294; 348/302; 348/187; 250/208.1; 257/443; 378/98.8

(58) Field of Classification Search ................ 348/247, 348/308, 370, 371, 187, 246, 302, 304, 306; 250/208.1, 214.1, 214 R, 370.11, 370.09; 257/414, 443, 232; 349/54, 192; 345/904; 378/98.8, 98.9

See application file for complete search history.

(56) References Cited

U.S. PATENT DOCUMENTS

| | | | | |
|---|---|---|---|---|
| 5,163,023 A | * | 11/1992 | Ferris et al. | 365/200 |
| 5,532,615 A | * | 7/1996 | Kondo et al. | 324/760.02 |
| 6,917,380 B1 | * | 7/2005 | Tay | 348/247 |
| 7,511,748 B2 | * | 3/2009 | Kagle et al. | 348/246 |
| 7,532,316 B2 | * | 5/2009 | Hachisuka | 356/237.1 |
| 7,872,680 B2 | * | 1/2011 | Misawa | 348/247 |
| 2006/0197854 A1 | * | 9/2006 | Kubo | 348/246 |
| 2006/0239580 A1 | * | 10/2006 | Dierickx | 382/274 |
| 2009/0160752 A1 | * | 6/2009 | Meynants | 345/100 |
| 2010/0094579 A1 | * | 4/2010 | Scheffer | 702/85 |

* cited by examiner

*Primary Examiner* — Lin Ye
*Assistant Examiner* — Marly Camargo
(74) *Attorney, Agent, or Firm* — Rennie William Dover

(57) ABSTRACT

Described herein are methods that may improve yield of an image sensor. In one embodiment, a method that may improve yield of an image sensor includes generating output values of control logic associated with an array of light sensitive elements. The method further may include determining if the control logic has one or more faulty output values. The method further may include automatically correcting the one or more faulty output values. In another embodiment, a method that may improve yield of an image sensor includes providing light to an array of light sensitive elements. The method further may include generating an image based on the light sensitive elements and associated control logic. The method further may include disconnecting control lines from control logic that has one or more faulty output values based on viewing the image. The method further may include generating another image based on the control logic having no faulty output values.

13 Claims, 6 Drawing Sheets

METHOD FOR CORRECTING IMAGE SENSOR CONTROL CIRCUITRY HAVING FAULTY OUTPUT VALUES AND STRUCTURE THEREFOR

REFERENCE TO RELATED APPLICATION

This application is a continuation of prior application Ser. No. 12/251,414, filed Oct. 14, 2008 now U.S. Pat. No. 7,974,805.

TECHNICAL FIELD

Embodiments of the disclosure generally relate to image sensors.

BACKGROUND

Large area image sensors (e.g., 8" by 8", 16" by 16") have various applications including x-ray applications, mammogram applications, medical applications, and for electron microscope applications. Typically, an x-ray imager may comprise a CMOS (Complementary Metal Oxide Semiconductor) image sensor and a scintillator. The scintillator converts x-rays to visible light, which impinges a photodiode in the image sensor. The image sensor also includes control logic and a readout circuit for reading a pixel of image information from the photodiode. A typical image sensor has photodiodes that form pixel arrays, control logic, and readout circuits to generate an entire image. The image may be displayed on a monitor or printed for viewing purposes.

Typically in large area sensors for x-ray applications, the control logic includes multiple shift registers in the y-direction of the image sensor. These registers are embedded in the pixel arrays to allow side butting of dies each having one or more sensor arrays. Physically separated dies are assembled together to create a large format image sensor. If a single shift register is corrupted with a faulty value, this affects the entire image sensor, which is then corrupt as well.

BRIEF DESCRIPTION OF THE DRAWINGS

The drawings refer to embodiments of the disclosure in which.

DETAILED DESCRIPTION

In the following description, numerous specific details are set forth, such as examples of image sensors, specific signals, pixel blocks, control logic, named components, connections, example dimensions, etc., in order to provide a thorough understanding of the present disclosure. It will be apparent, however, to one of ordinary skill in the art that the present disclosure may be practiced without these specific details. In other instances, well known components or methods have not been described in detail but rather in a block diagram in order to avoid unnecessarily obscuring the present disclosure. The specific details set forth are merely exemplary. The specific details may be varied from and still be within the spirit and scope of the present disclosure.

In general, various methods are described that may improve yield of an image sensor. In one embodiment, a manual method that may improve yield of an image sensor includes providing light to an array of light sensitive elements. The method further may include generating an image based on the light sensitive elements and associated control logic. The method further may include inspecting the image to determine if the control logic has one or more faulty output values. The method further may include disconnecting control lines from control logic that has one or more faulty output values. The method further may include generating another image based on the control logic having no faulty output values. The manual method can be implemented with minimal additional circuitry (e.g., buffer logic) and no additional control lines.

In another embodiment, an automatic method that may improve yield of an image sensor includes providing light to the image sensor. The method further may include generating output values of control logic associated with the image sensor. The method further may include determining if the control logic has one or more faulty output values. The method further may include automatically correcting the one or more faulty output values. The method further may include automatically generating an image based on the control logic having no faulty output values. The automatic method does not have user action or intervention for disconnecting the control logic having faulty output values. The automatic and manual methods both may improve yield for image sensors by having redundant control logic, which is particularly important for large area image sensors that are typically more vulnerable to processing defects and therefore tend to have a lower yield than what is considered to be normal in semiconductor processing.

Figure 1:
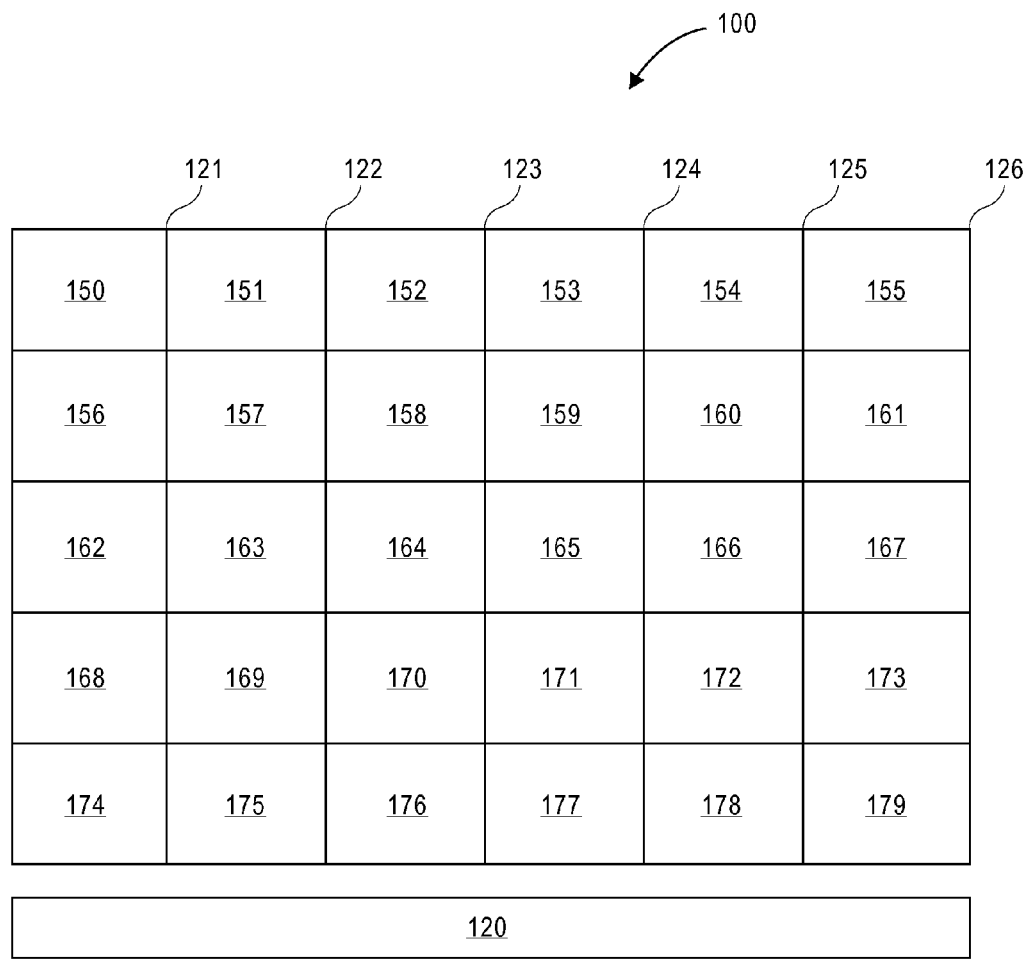
FIG. 1 shows a block diagram of an embodiment of an image sensor.

FIG. 1 shows a block diagram of an embodiment of an image sensor. The image sensor 100 may be an array of elements used for various applications. In one embodiment, the image sensor 100 includes pixel blocks 150-179, sensor read out circuitry 120, and control logic 121-126. Each pixel block includes an array of pixels. The image sensor 100 may be implemented in a CMOS or MOS technology with each pixel being a passive or an active pixel. A passive pixel sensor is a photodiode (MOS or p-n junction diode) with a transistor acting as a switch that passes photo-electrically generated signal charge to an amplifier outside the pixel array. The term "active pixel" refers to any pixel that has an active element integrated in the pixel, that is, at least one amplifier that typically includes one or more transistors to amplify the charge that is collected on the light sensitive element in the pixel.

The sensor read out circuitry 120 is coupled to the pixel blocks. The sensor read out circuitry 120 may include output buses, registers, multiplexers, and addressing switches for reading out pixel values from the pixel blocks. In one embodiment, the control logic includes circuitry or is coupled to circuitry that can manually or automatically disconnect control lines from faulty output values. In another embodiment, the control logic includes circuitry or is coupled to circuitry that automatically corrects faulty output values.

Figure 2:
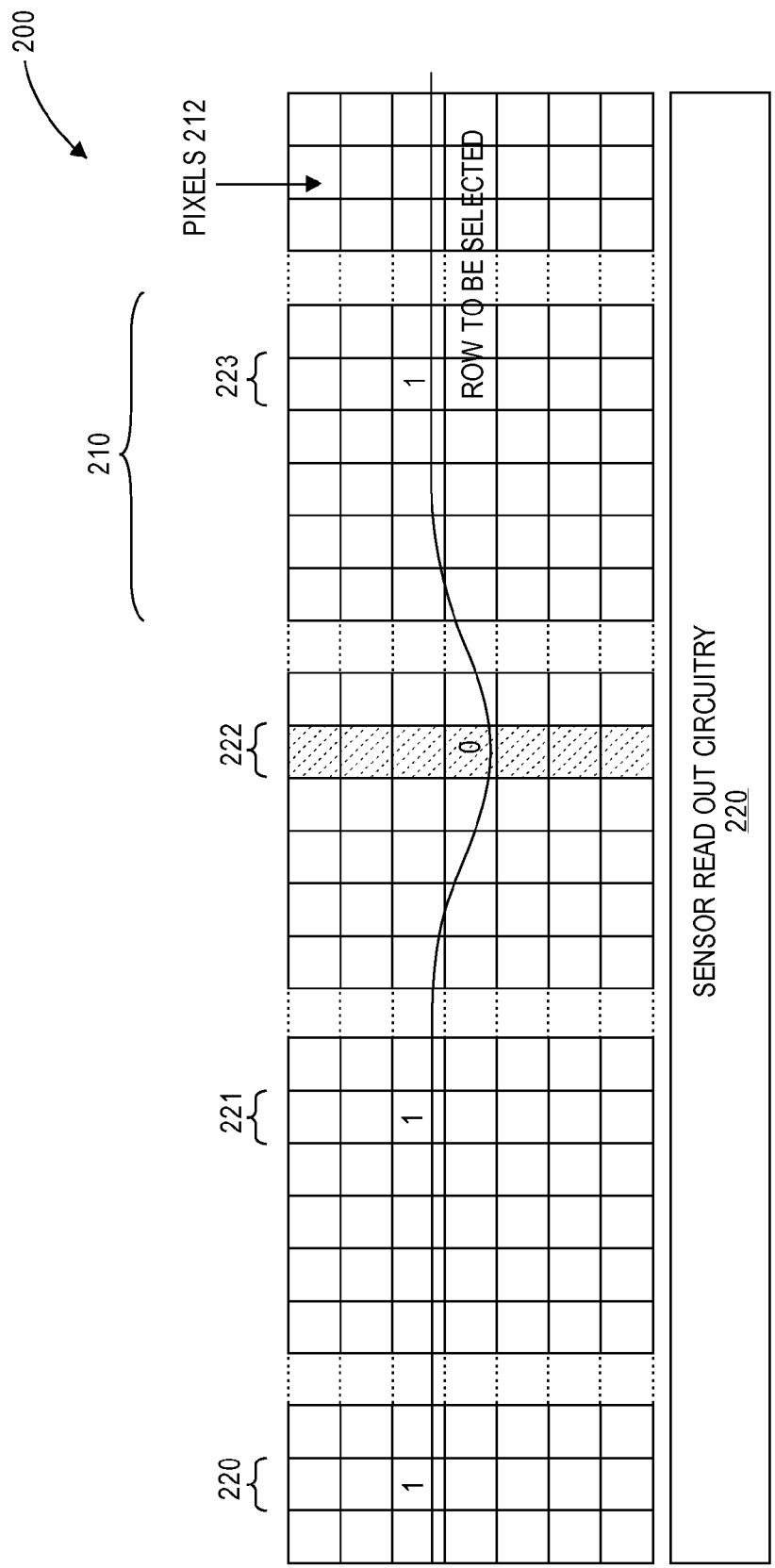
FIG. 2 shows a block diagram of an embodiment of a section of an image sensor having control logic.

FIG. 2 shows a block diagram of an embodiment of a section of an image sensor having control logic. The section of an image sensor 200 includes pixel blocks 210 repeated multiple times with each pixel block having an array of pixels 212. The vertical columns of control logic 220-223 outputs output values (e.g., 1, 1, 0, and 1) corresponding to pixels to be selected and then read out by the sensor read out circuitry 220. In an embodiment, one column of control logic is embedded in each pixel block in a stitched pattern.

In one embodiment, the zero value found in control logic 222 may be a faulty output value. This faulty output value can be manually or automatically removed by disconnecting the control line associated with the zero value in control logic 222. In an embodiment, the control logic includes buffer logic that can be manually disabled or manually configured in a high impedance tri-state mode for disconnecting control lines associated with faulty output values as described below in conjunction with FIG. 4. In another embodiment, the control logic includes a fault detection circuit that automatically corrects faulty output values as described below in conjunction with FIG. 6.

Figure 3:
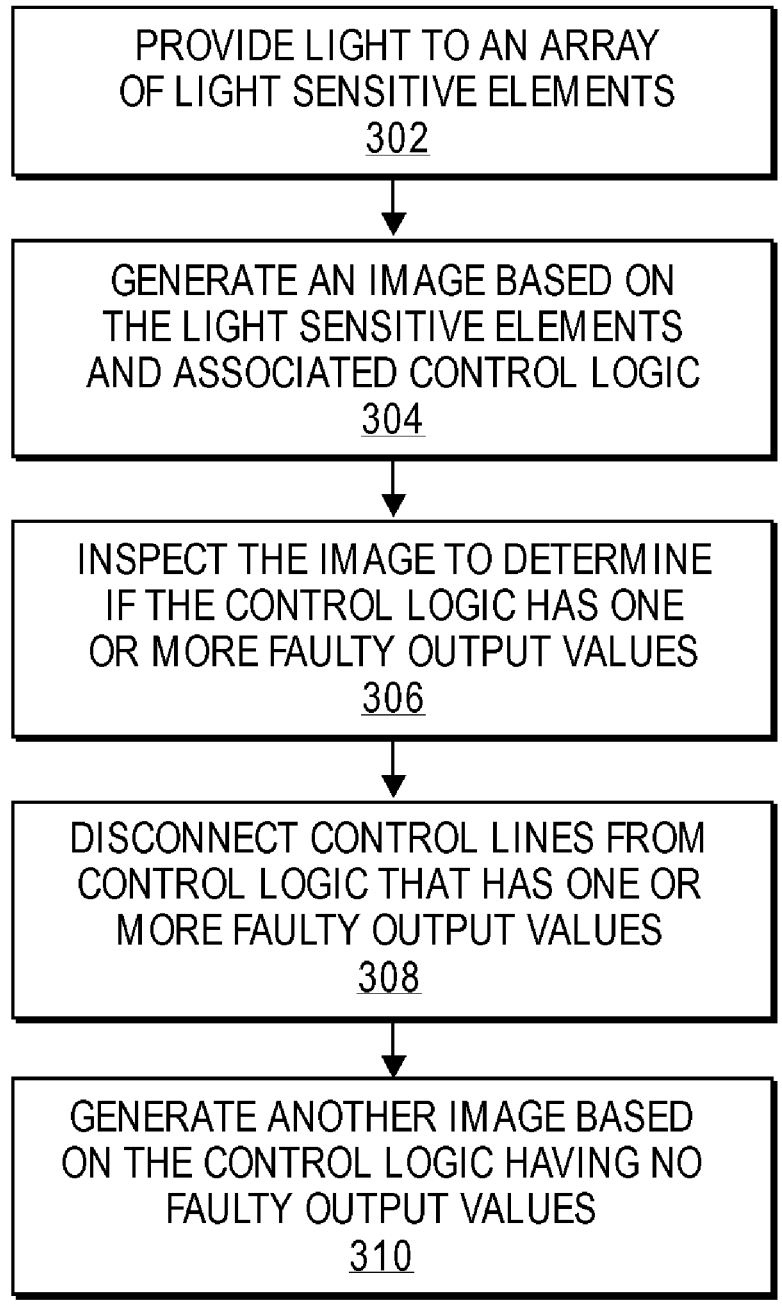
FIG. 3 shows a manual method that may improve yield of an image sensor in accordance with one embodiment.

FIG. 3 shows a manual method that may improve yield of an image sensor in accordance with one embodiment. The method includes providing light to an array of light sensitive elements at block 302. The method further may include generating an image based on the array of light sensitive elements and associated control logic at block 304. The method further may include inspecting the image to determine if the control logic has one or more faulty output values at block 306. The method further may include disconnecting control lines from control logic that has one or more faulty output values at block 308. The method further may include generating another image based on the control logic having no faulty output values at block 310.

In one embodiment, the control logic is coupled to tri-state buffer logic, which is coupled to the control lines. The tri-state buffer logic associated with control logic having one or more faulty output values is configured in a high impedance tri-state mode in order to disconnect one or more control lines from control logic having one or more faulty output values. The one or more disconnected control lines can be controlled with neighboring control logic (e.g., a neighboring column of control logic having no faulty output values). Thus, the tri-state buffer logic adds redundancy to the control logic that may improve yield in image sensors.

The tri-state buffer logic can be manually configured in a high impedance tri-state mode based on inspection of an image having faulty output values. Alternatively, the tri-state buffer logic can be automatically configured in a high impedance tri-state mode based on a software program. The software program may determine that faulty output values exist by analyzing the image. The software program can then automatically configure the tri-state buffer logic associated with the faulty output values of the control logic. The control logic may include shift registers, flip-flops, and/or address decoders.

Figure 4:
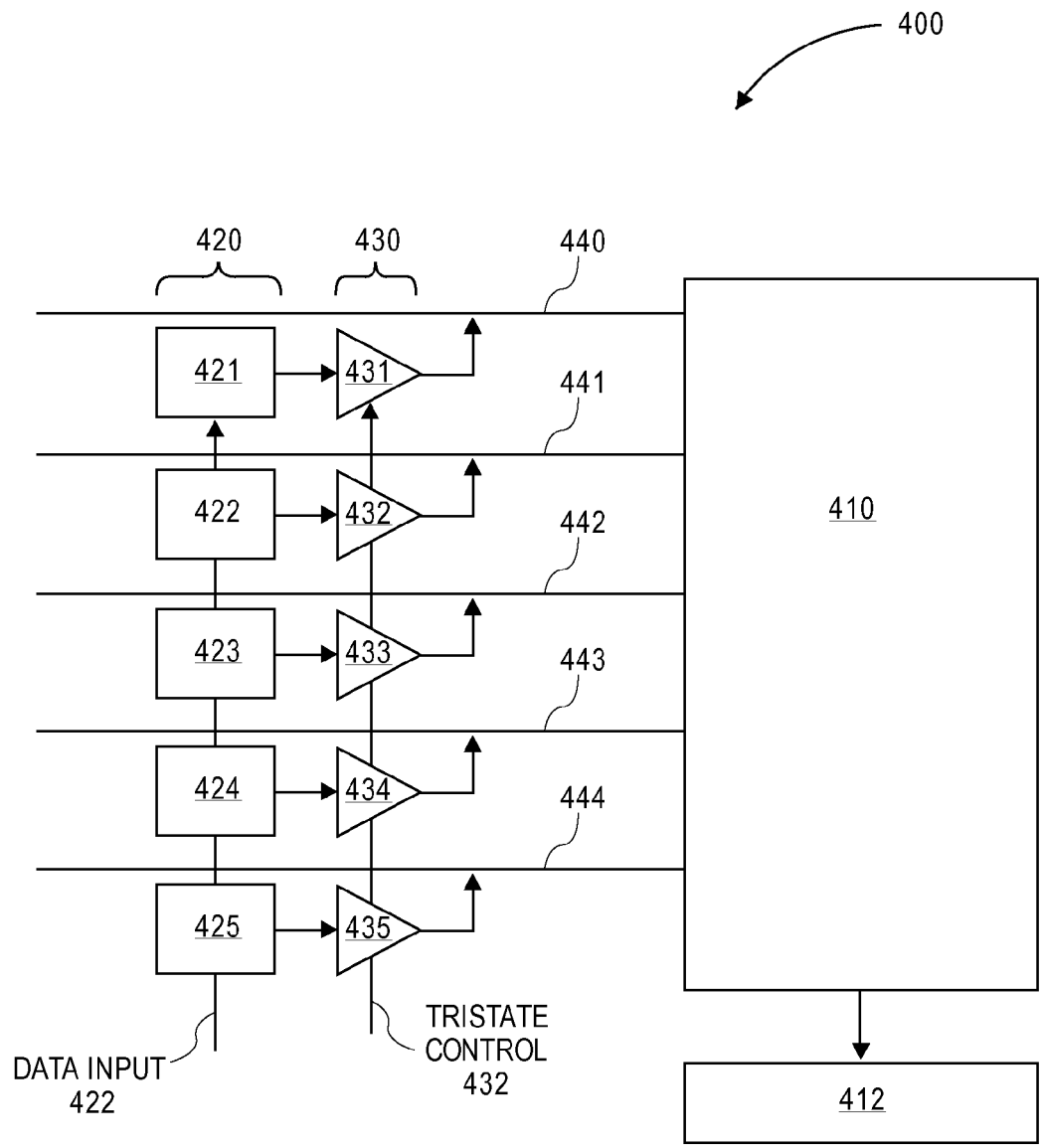
FIG. 4 shows a block diagram of an embodiment of a section of an image sensor having control logic coupled to buffer logic.

FIG. 4 shows a block diagram of an embodiment of a section of an image sensor having control logic coupled to buffer logic. The section 400 is repeated numerous times to form the image sensor 100. In one embodiment, the section 400 includes pixel block 410 having an array of light sensitive elements. The pixel block 410 is coupled to read out circuitry 412 and control lines 440-444. Control logic 420 (e.g., shift register, flip-flop, and address decoder) represents one column of control logic in the image sensor. The control logic is coupled to control lines (e.g., reset signals, select lines, level shift signals, status signals, etc.) The control logic 420 receives data input 422 for selecting control lines 440-444. Each block 421-425 of control logic 420 is coupled to one of the buffers 431-435 of tri-state buffer logic 430. Each buffer is coupled to one of the control lines 440-444. The one or more buffers 431-435 of the tri-state buffer logic associated with blocks 421-425 having faulty output values are configured in a high impedance tri-state mode in order to disconnect control lines from control logic having faulty output values.

In one embodiment, the control logic 420 has one or more faulty output values. The control lines 440, which may be select lines, are configured to manually disconnect from one or more blocks 421-425 of the control logic 422 having one or more faulty output values based on viewing an image of the image sensor and manually configuring the buffers in a tri-state mode. For example, a user can manually place buffer 433 in a high impedance tri-state mode if block 423 has a faulty output value. The control line 442 will be disconnected from block 423. A neighboring parallel column of blocks having no faulty output values can take over control of the control line 442. Thus, redundancy has been added to the control logic.

In another embodiment, the control lines are automatically configured to disconnect from one or more sections of the control logic having one or more faulty output values based on a software program determining whether one or more faulty output values exist. For example, the software program may determine that certain blocks of the control logic have faulty output values by comparing the image with a threshold value and then automatically place buffers that are associated with these blocks in a tri-state mode.

Figure 5:
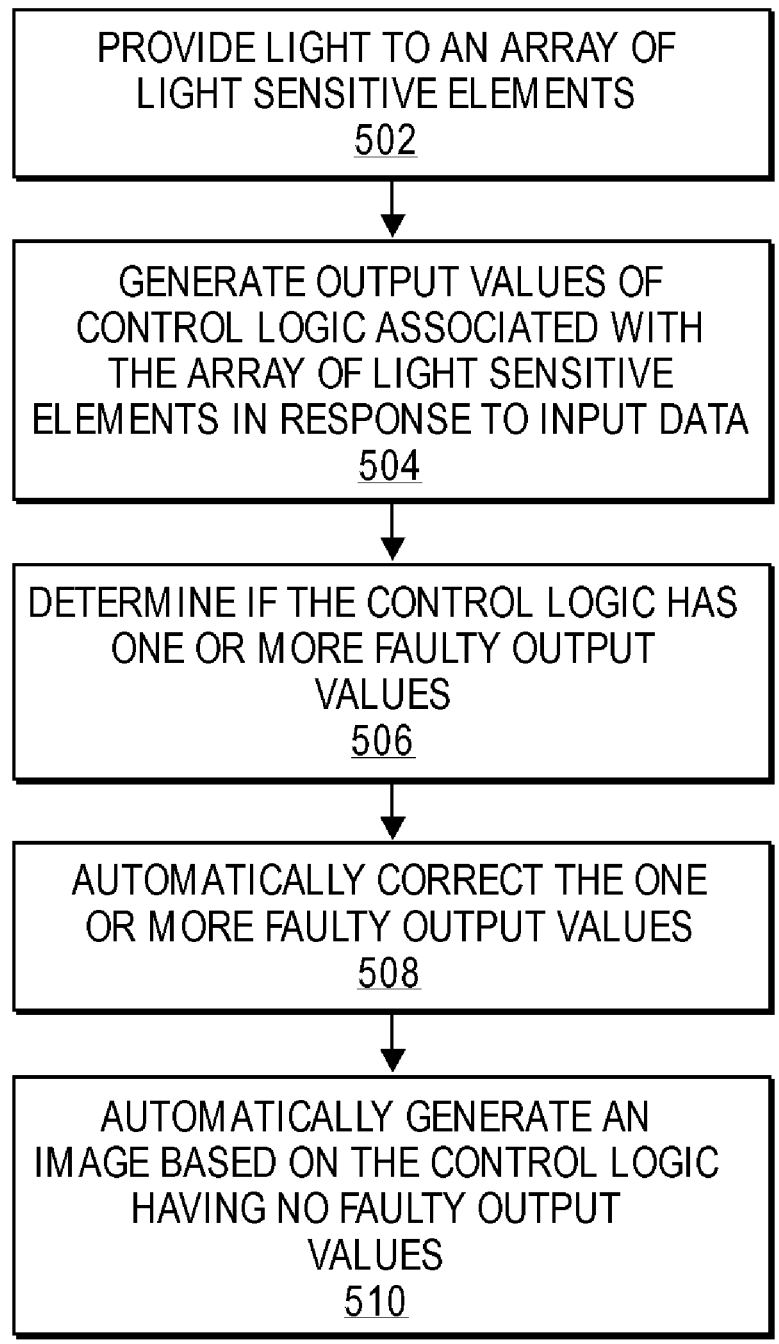
FIG. 5 shows an automatic method that may improve yield of an image sensor in accordance with one embodiment.

FIG. 5 shows a method that may improve yield of an image sensor in accordance with one embodiment. The method optionally includes providing light to an array of light sensitive elements at block 502. The method further may include generating output values of control logic in response to input data at block 504. The control logic is associated with the array of light sensitive elements. The method further may include determining if the control logic has one or more faulty output values at block 506. The method further may include automatically correcting the one or more faulty output values at block 508. The method further may include automatically generating an image based on the control logic having no faulty output values at block 510.

In one embodiment, the control logic is coupled to a fault detection circuit (e.g., majority voting circuit). The majority voting circuit determines if the control logic has one or more faulty output values by comparing each output value to one or more neighbor output values. For another embodiment, the majority voting circuit determines if the control logic has one or more faulty output values by comparing an output value i to output values i+1 and i−1 with i being an integer number.

Figure 6:
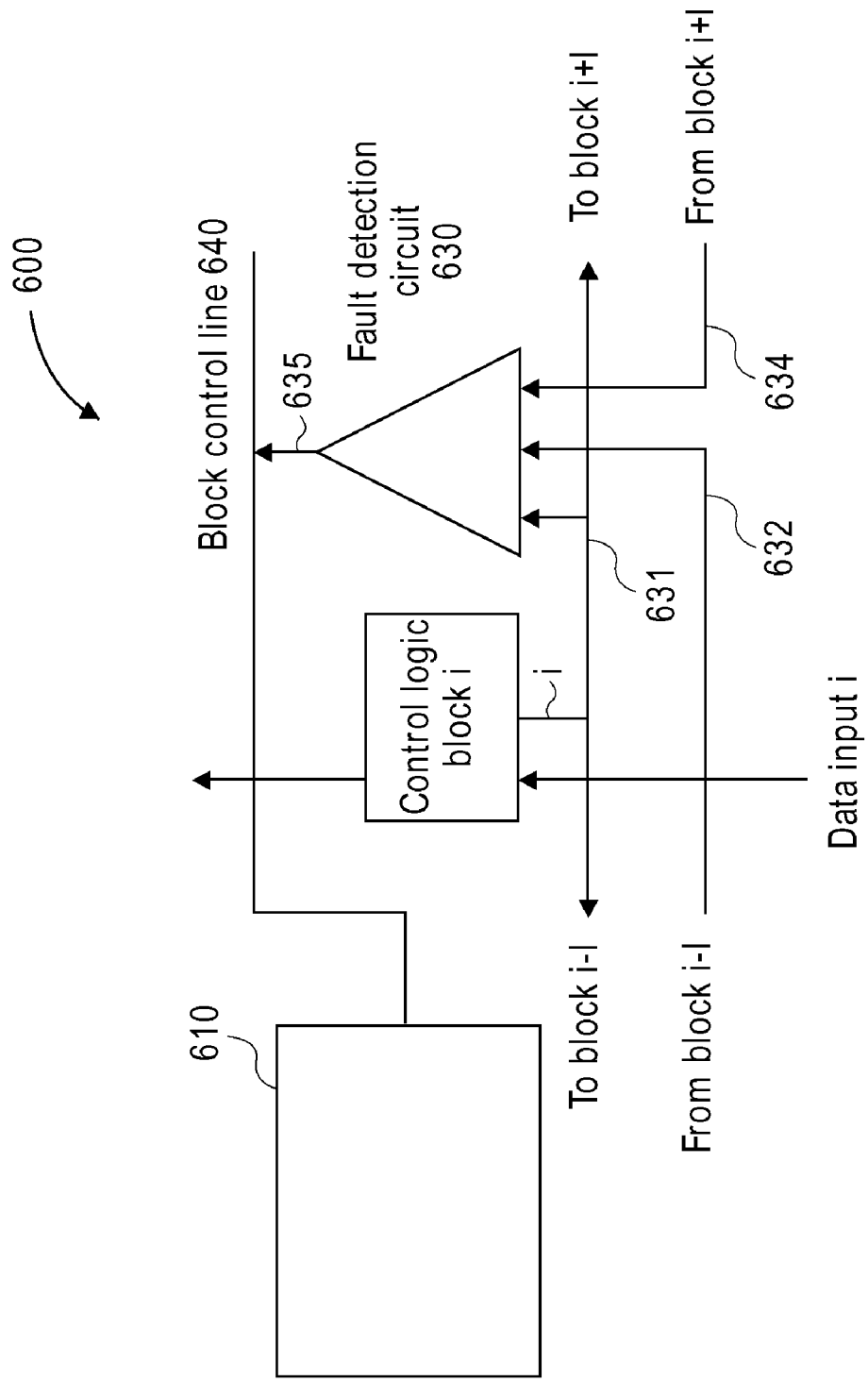
FIG. 6 shows a block diagram of an embodiment of a section of an image sensor having control logic with a fault detection circuit.

FIG. 6 shows a block diagram of an embodiment of a section of an image sensor having a fault detection circuit. In one embodiment, the section 600 is repeated numerous times in combination with pixel blocks to form the image sensor 100. The pixel block 610 includes an array of light sensitive elements. The pixel block 610 is coupled to block control line 640, which can be a row or column select line. Additional block control lines from other sections are also coupled to the pixel block 610 for selecting pixels to be read out from the pixel block 610. The control logic block i, with i being an integer, generates output values i in response to receiving data input signal i. A fault detection circuit 630 is coupled to the control logic blocks i, i+1, and i−1 to automatically determine if the control logic blocks have one or more faulty output values. The fault detection circuit 630 automatically corrects the one or more faulty output values of the control logic block and generates corrected output values 635.

In one embodiment, the block control line 640 receives the corrected output values 635 from the fault detection circuit 630. The corrected output values are used to generate an image with substantially no faulty values. The fault detection circuit 630 determines if the control logic has one or more faulty output values by comparing each output value to one or more neighbor output values.

In certain embodiments, the fault detection circuit 630 is a majority voting circuit. The majority voting circuit determines if the control logic has one or more faulty output values by comparing an output value i received from control logic block i to output values i+1 and i−1 received from control logic blocks i+1 and i−1, respectively. The majority output value for the three logic blocks is determined to be the correct output value for logic block i.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

While some specific embodiments of the disclosure have been shown the disclosure is not to be limited to these embodiments. The disclosure is to be understood as not limited by the specific embodiments described herein.

What is claimed is:

1. A method, comprising:
   providing a pixel block that comprises an array of light sensitive elements;
   generating an image based on the light sensitive elements and associated control logic, wherein the control logic is coupled to a tri-state buffer logic circuit which is coupled to control lines;
   generating another image based on the control logic having no faulty output values;
   inspecting the image to determine if the control logic has one or more faulty output values; and
   configuring the tri-state buffer logic circuit associated with the control logic that has the one or more faulty output values in a high impedance tri-state mode to disconnect the control lines from control logic that has one or more faulty output values.

2. The method of claim 1, wherein the control logic comprises at least one of shift registers, flip-flops, and address decoders.

3. The method of claim 1, wherein the disconnected control lines can be controlled with neighboring control logic.

4. The method of claim 1, wherein disconnecting control lines from control logic that has one or more faulty output values occurs manually or automatically based on a software program.

5. An image sensor, comprising:
   a pixel block that comprises an array of light sensitive elements;
   control logic circuitry coupled to the array of light sensitive elements, wherein the image sensor is configured for generating an image based on the control logic circuitry having no faulty output values;
   control lines coupled to the control logic circuitry, one or more sections of the control logic circuitry having one or more faulty output values, the control lines are configured to disconnect from one or more sections of the control logic circuitry having the one or more faulty output values; and
   a tri-state buffer logic circuit coupled to the control logic circuitry and the control lines, wherein the tri-state buffer logic circuit associated with control logic circuitry having faulty output values is configured in a high impedance tri-state mode in order to disconnect control lines from control logic circuitry having faulty output values.

6. The image sensor of claim 5, wherein the control lines are manually configured to disconnect from one or more sections of the control logic circuitry having one or more faulty output values based on viewing an image of the image sensor.

7. The image sensor of claim 5, wherein the control lines are automatically configured to disconnect from one or more sections of the control logic circuitry having one or more faulty output values based on a software program determining whether one or more faulty output values exist.

8. The image sensor of claim 5, wherein the control logic circuitry comprises at least one of a shift register, a flip-flop, and an address decoder.

9. The image sensor of claim 5, wherein the disconnected control lines can be controlled with neighboring control logic circuitry.

10. The image sensor of claim 5, wherein a neighboring control logic circuitry is one or more columns of control logic circuitry located parallel to the control logic circuitry having one or more faulty output values.

11. The image sensor of claim 5, wherein the control logic circuitry is embedded in the array of light sensitive elements in a stitched pattern.

12. The image sensor of claim 5, further comprising:
    read out circuitry coupled to the array of light sensitive elements, the read out circuitry to read out pixel values for the image sensor.

13. An apparatus, comprising:
    means for generating an image based on an array of light sensitive elements and associated control logic, wherein the apparatus is configured for generating an image based on the control logic having no faulty output values;
    means for disconnecting control lines from control logic that has one or more faulty output values based on viewing the image, wherein the control logic is coupled to a tri-state buffer logic circuit which is coupled to the control lines;
    means for providing light to the array of light sensitive elements; and
    means for configuring the tri-state buffer logic circuit associated with control logic having faulty output values in a high impedance tri-state mode in order to disconnect control lines from the control logic having faulty output values.

* * * * *